United States Patent [19]

Murphy et al.

[11] 3,787,750

[45] Jan. 22, 1974

[54] FLYING SPOT SCANNER SYSTEM HIGH VOLTAGE AND HORIZONTAL DEFLECTION CIRCUITRY

[75] Inventors: William D. Murphy; Edward I. Zmuda, both of Seneca Falls, N.Y.

[73] Assignee: GTE Sylvania Incorporated, Seneca Falls, N.Y.

[22] Filed: July 13, 1972

[21] Appl. No.: 271,630

[52] U.S. Cl. .......... 315/27 TD

[51] Int. Cl. .......... H01j 29/70

[58] Field of Search .......... 315/27–29, 26; 178/7.5 R

[56] References Cited

UNITED STATES PATENTS

| | | | |
|---|---|---|---|
| 3,609,447 | 9/1971 | Hirota | 315/27 TD |
| 3,235,767 | 2/1966 | Bahring | 315/27 TD |
| 3,629,497 | 12/1971 | Soardi | 315/27 TD |
| 3,111,603 | 11/1963 | Marshall et al. | 315/27 TD |

*Primary Examiner*—Maynard R. Wilbur
*Assistant Examiner*—J. M. Potenza
*Attorney, Agent, or Firm*—Norman J. O'Malley; Cyril A. Krenzer; Thomas H. Bufton

[57] ABSTRACT

High voltage and horizontal deflection circuitry for a flying spot scanner system includes a first inductance associated with a flying spot scanner tube and having an inductance value in an amount sufficient to effect a desired horizontal deflection of an electron beam of the scanner tube and a second inductance which, in combination with the first inductance, provides an inductive value of an amount sufficient to cause development of a desired high voltage potential sufficient to operate the scanner tube.

7 Claims, 2 Drawing Figures

FLYING SPOT SCANNER SYSTEM HIGH VOLTAGE AND HORIZONTAL DEFLECTION CIRCUITRY

BACKGROUND OF THE INVENTION

Generally, high voltage and horizontal deflection circuitry for a color television receiver includes a drive signal source connected to the primary winding of a high voltage transformer which is coupled to a DC potential source. Also, the horizontal winding of a deflection yoke is connected to circuit ground and via a coupling capacitor to the junction of the drive signal source and primary winding of the high voltage transformer. Moreover, a damper diode couples the source and primary winding to circuit ground.

In operation, a drive signal from the source causes a sawtooth-shaped current flow in the horizontal winding of the deflection yoke whereupon an electron beam of a cathode ray tube is deflected from the center to the right side of the tube. When the drive signal from the source is removed, the high level of current flowing in the horizontal winding of the deflection yoke causes development of a relatively high voltage pulse potential at the primary winding of the high voltage transformer. Since current leads the voltage by 90°, current flow in the horizontal winding is at a maximum in the negative direction when the above-mentioned pulse potential falls to zero. Thus, the electron beam is deflected to the extreme left side of the tube or screen. Moreover, the current tends to ring or advance in a negative direction beyond a zero value whereupon the previously mentioned damper diode conducts causing the electron beam to advance from the positional location at the left of the screen to the center of the screen. Thereupon, the signal source initiates a repeat of the cycle.

Further, the relatively high voltage potential resulting from the collapse of the magnetic field of the primary winding of the high voltage transformer permits development of a stepped-up or multiplied high voltage potential. Moreover, the resultant high voltage potential is dependent upon the supply potential and inductance of the system whereby sufficient flux is developed in the transformer core while sufficient current flows in the horizontal winding to provide the desired deflection.

However, in flying spot scanner systems wherein a flying spot scanner tube is employed as a light source for scanning a film, for example, it has been found that the scanner tube requires a relatively high voltage potential but a relatively low horizontal deflection capability when compared with the horizontal deflection requirements of a television receiver. Thus, the flying spot scanner system requires a magnetic flux of an amount sufficient to provide a desired high voltage potential and, at the same time, a reduced magnitude of horizontal deflection of an electron beam.

One known technique for achieving the above-mentioned high voltage potential and reduced horizontal deflection capability is to use a yoke having a lower sensitivity. However, yokes with lower sensitivity have the added disadvantage of poor rectalinearity or higher pin-cushion distortion which is of course most undesirable. Other techniques include a drive signal of increased magnitude which unfortunately increases component costs and reduces reliability.

OBJECTS AND SUMMARY OF THE INVENTION

Therefore, it is an object of this invention to provide a flying spot scanner system having enhanced high voltage and horizontal deflection capabilities. Another object of the invention is to improve the reliability and reduce the cost of high voltage and horizontal deflection circuitry of a flying spot scanner system. Still another object of the invention is to provide high voltage and horizontal deflection circuitry employing parallel coupled inductances wherein one of the parallel inductances provides the desired horizontal deflection capability and the total inductance provides the high voltage capability.

PREFERRED EMBODIMENTS OF THE INVENTION

For a better understanding of the present invention, together with other and further objects, advantages and capabilities thereof, reference is made to the following disclosure and appended claims in connection with the accompanying drawings.

Figure 1:
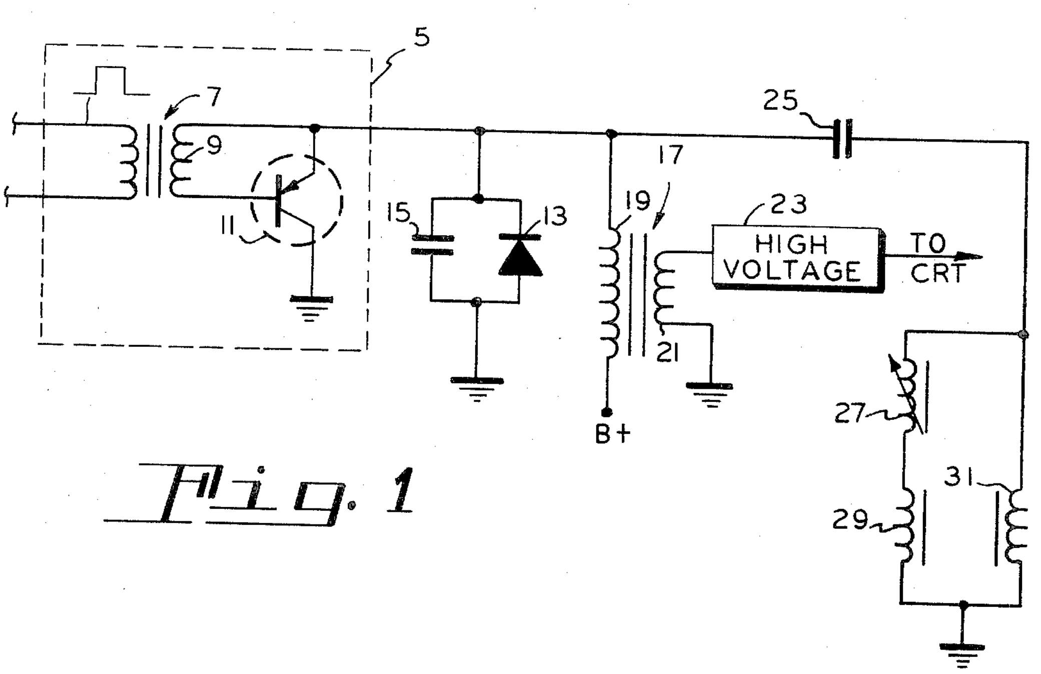
FIG. 1 illustrates a preferred embodiment of the invention in the form of high voltage and horizontal deflection circuitry for a flying spot scanner system.

Referring to the drawings, the embodiment of FIG. 1 includes a pulse wave signal source 5 including a transformer 7 having a secondary winding 9 coupled to the base and emitter of a transistor 11 with the collector thereof coupled to a potential reference level such as circuit ground. A damper in the form of a diode 13 is shunted by a tuning capacitor 15 and couples the pulse wave signal source 5 to a potential reference level.

A transformer 17 has a primary winding 19 coupled to the output of the pulse wave signal source 5 and damper diode 13 and to a DC potential source B+. A secondary winding 21 of the transformer 17 is coupled to a potential reference level, such as circuit ground, and by way of a high voltage rectifier 23 to a cathode ray tube. A coupling capacitor 25 interconnects the junction of the signal source 5 and primary winding 19 of the transformer 17 and a series connected variable inductor 27 and horizontal deflection yoke winding 29 coupled to circuit ground.

An auxillary inductance 31 is shunted across the series connected variable inductor 27 and horizontal deflection yoke winding 29. This auxillary inductance 31 and the horizontal deflection yoke winding 29 preferably have an inductance ratio in the range of about 1:6. Moreover, a preferred inductance value for the auxillary inductance is about 0.2M Henry with an inductance value of about 1.2M Henry for the horizontal deflection yoke winding 29 and about 0.2M Henry for the variable inductor 27.

As to operation, the inductance necessary to the development of a desired high voltage potential includes the parallel coupled series connected variable inductor 27 and horizontal deflection yoke winding 29 along the auxillary inductance 31. Moreover, the inductance necessary to the development of the horizontal deflection of an electron beam for a cathode ray tube is provided by the horizontal deflection yoke winding 29.

As a pulse wave signal is applied to the transistor 11 of signal signa source 5, a sawtooth-shaped current flows in the horizontal deflection yoke winding 29 causing the electron beam of a cathode ray tube to be deflected from the center to the right side of a display screen. Moreover, the current flow through the horizontal deflection yoke winding 29 and the auxillary inductance 31 is in the ratio of about 1:6 respectively.

When the pulse wave signal is removed from the transistor 11 of the signal source 5, the relatively high current flowing in the horizontal deflection yoke winding 27 and the auxillary inductance 31 causes development of a high positive voltage pulse potential at the emitter of the transistor 11. Since current leads the voltage by 90°, yoke current is at a maximum in the negative direction when the pulse voltage drops to zero. Thus, the electron beam is deflected to the extreme left of the display screen. As the voltage tends to advance beyond the zero point in a negative direction, the damper diode 13 conducts whereupon the current advances toward zero and the electron beam returns to the center of the display screen. The cycle is then repeated.

Figure 2:
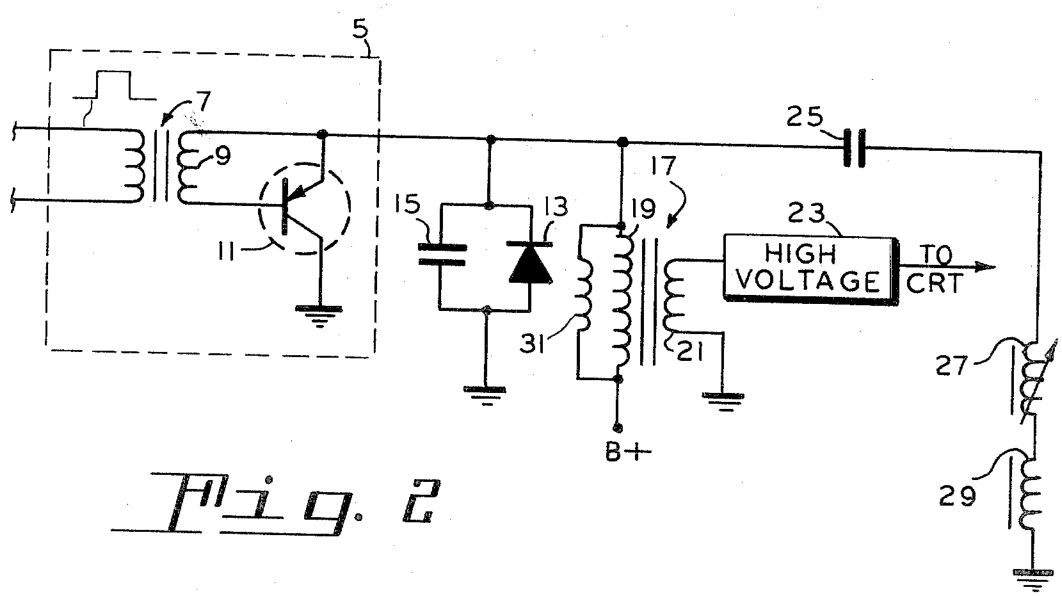
FIG. 2 illustrates an alternate preferred embodiment of high voltage and horizontal deflection circuitry.

FIG. 2 illustrates an alternate embodiment of the invention and employs the same components bearing the same numbers as FIG. 1. Herein, the auxillary inductance 31 is shunt coupled to the primary winding 19 of the transformer 17. Thus, only the current required for horizontal deflection rather than the total inductance current passes through the coupling capacitor 25 whereby the size of the capacitor 25 may be, but not necessarily need be, reduced. Moreover, the operation is substantially identical to the operation of the embodiment of FIG. 1 except for this reduced current flow through the capacitor 25.

While there has been shown and described what is at present considered the preferred embodiments of the invention, it will be obvious to those skilled in the art that various changes and modifications may be made therein without departing from the invention as defined by the appended claims.

What is claimed is:

1. In a flying spot scanner system, high voltage and horizontal deflection circuitry comprising:

a pulse wave signal source;

high voltage circuit means including potential damping means coupling said signal source to a potential reference level and transformer means having a first inductor in the form of a primary winding coupling said signal source to a potential source and a second inductor in the form of a secondary winding coupled to a potential reference level and via high voltage rectifier means to a cathode ray tube;

deflection circuit means in the form of a third inductance coupled to a potential reference level and via a capacitor means to said pulse wave signal source and high voltage circuit means; and auxillary coil means shunting said third inductance whereby said deflection circuit means provides inductance in an amount sufficient for horizontal deflection of an electron beam and said deflection circuit means and auxillary coil means combine to provide inductance in an amount sufficient for development of high voltage potentials for said cathode ray tube.

2. The high voltage and horizontal deflection circuitry of claim 1 wherein said deflection circuit means and auxillary coil means have an inductance ratio in the range of about 6:1.

3. The high voltage and horizontal deflection circuitry of claim 1 wherein said deflection circuit means includes an adjustable inductance in series connection with said third inductance intermediate said capacitor means and potential reference level.

4. The high voltage and horizontal deflection circuitry of claim 1 wherein said deflection circuit means and auxillary coil means provide a total inductance in an amount sufficient to provide a pulse potential of a magnitude sufficient for development of high voltage potential for a cathode ray tube and having a period substantially equal to the retrace period of a television receiver.

5. The high voltage and horizontal deflection circuitry of claim 1 wherein the current flow through said deflection circuit means and auxillary coil means is in the ratio of about 1:6.

6. In a flying spot scanner system, high voltage and horizontal deflection circuitry comprising:

a pulse wave signal source;

high voltage circuit means including a damper diode coupling said signal source to a potential reference level and transformer means having a primary winding coupling said signal source to a potential source and a secondary winding coupled to a high voltage rectifier means;

deflection circuit means in the form of a series connected alterable inductance and first inductance coupled via a capacitor means to said signal source and to said potential reference level; and auxillary coil means in the form of a second inductance shunting said primary winding of said transformer means whereby horizontal deflection capability is developed by the flow of a minor portion of induced current and high voltage potential capability is developed by the total flow of induced current in said circuitry.

7. The high voltage and horizontal deflection circuitry of claim 6 wherein said first inductance of said deflection circuit means and said auxillary coil means have an inductance value in the ratio of about 6:1 respectively.

* * * * *